United States Patent
Rao et al.

(10) Patent No.: US 8,831,117 B2
(45) Date of Patent: Sep. 9, 2014

(54) PEAK-TO-AVERAGE POWER RATIO REDUCTION WITH BOUNDED ERROR VECTOR MAGNITUDE

(75) Inventors: Raghavendar M. Rao, Austin, TX (US); Christopher H. Dick, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 610 days.

(21) Appl. No.: 12/430,863

(22) Filed: Apr. 27, 2009

(65) Prior Publication Data

US 2010/0272195 A1 Oct. 28, 2010

(51) Int. Cl.
*H04L 27/28* (2006.01)
*H04L 27/34* (2006.01)
*H04L 27/26* (2006.01)

(52) U.S. Cl.
CPC ........ *H04L 27/2614* (2013.01); *H04L 27/3411* (2013.01)
USPC ........... 375/260; 375/261; 375/295; 375/296; 375/297; 375/298; 375/346; 370/203; 370/208; 370/210

(58) Field of Classification Search
USPC .......................... 375/219, 260, 267, 295–297; 330/149–152; 370/203, 208, 210; 455/114.2, 115.1
See application file for complete search history.

(56) References Cited

U.S. PATENT DOCUMENTS

2008/0019453 A1* 1/2008 Zhao et al. .................... 375/260

FOREIGN PATENT DOCUMENTS

| JP | 2009-177629 | 6/2009 |
|---|---|---|
| WO | WO 2005/055479 A1 | 6/2005 |
| WO | WO 2005/096580 A1 | 10/2005 |

OTHER PUBLICATIONS

Krongold, B.S. et al., "PAR Reduction in OFDM via Active Constellation Extension" IEEE Trans. on Broadcasting, vol. 49, No. 3, pp. 258-268, Sep. 2003.*
Kumara, A.P.T.G. et al, "PAR Reduction in Space-Time Coded OFDM via Modified Active Constellation Extension" IEEE Conference on Innovative Technologies in Intelligent Systems and Industrial Applications, CITSIA 2008, Jul. 12, 2008, pp. 71-75, N J, USA.*
Saul, A. "Generalized Active Constellation Extension for Peak Reduction in OFDM Systems", IEEE International Conference on communications—ICC 2005, vol. 3, May 16, 2005-May 20, 2005, pp. 1974-1979, N J, USA.*
Krongold, B. S., et al., "PAR Reduction in OFDM via Active Constellation Extension", IEEE Transactions on Broadcasting, vol. 49, No. 3, Sep. 2003, pp. 258-268.
Kumara, A.P.T.G. et al, "PAR reduction in Space-Time coded OFDM via Modified Active Constellation Extension", IEEE Conference on Innovative Technologies in Intelligent Systems and Industrial Applications, CITISIA 2008, Jul. 12, 2008, pp. 71-75, NJ, USA.
Malkin, M. et al., Optimal constellation distortion for PAR reduction in OFDM systems, IEEE 19$^{th}$ International Symposium on Personal Indoor and Mobile Radio Communications—PIMRC 2008, Sep. 15, 2008, pp. 1-5, NJ, USA.

(Continued)

*Primary Examiner* — Daniel Washburn
*Assistant Examiner* — Eboni Hughes
(74) *Attorney, Agent, or Firm* — W. Eric Webostad

(57) ABSTRACT

Method and apparatus for signal processing to minimize the peak to average power ratio of an Orthogonal Frequency Division Multiplexing ("OFDM") or Orthogonal Frequency Division Multiple Access ("OFDMA") signal with bounded error vector magnitude for an integrated circuit are described. An Active Constellation Extension ("ACE") iteration, using a constellation points adjustment module, is performed. Symbols outside of a bounded region after the ACE iteration are identified. The bounded region is determined responsive to an error vector magnitude target. The symbols identified are translated to the bounded region.

18 Claims, 9 Drawing Sheets

(56) References Cited

OTHER PUBLICATIONS

Prabhu, R. S. et al., "Active constellation modification techniques for OFDM PAR reduction", IEEE AEROSPACE Conference, 2009, Mar. 7, 2009, pp. 1-8, NJ, USA.

Saul, A. "Generalized active constellation extension for peak reduction in OFDM systems", IEEE International Conference on communications—ICC 2005, vol. 3, May 16, 2005-May 20, 2005, pp. 1974-1979, NJ, USA.

Andoh, H. et al., Comparison of PAPR Reduction Methods for OFDM Signal with Channel Coding, Report of the Institute of Electronics, Information and Communication Engineers, RCS, Radio Communications System, Nov. 12, 2008, vol. 108, No. 305, pp. 19-24. (abstract only).

Jones, Douglas J., "Peak Power Reduction in OFDM and DMT via Active Channel Modification", Conference Record of the Thirty-Third Asilomar Conference on Signals, Systems, and Computers, vol. 2, Oct. 24-27, 1999, pp. 1076-1079, Pacific Grove, CA USA.

* cited by examiner

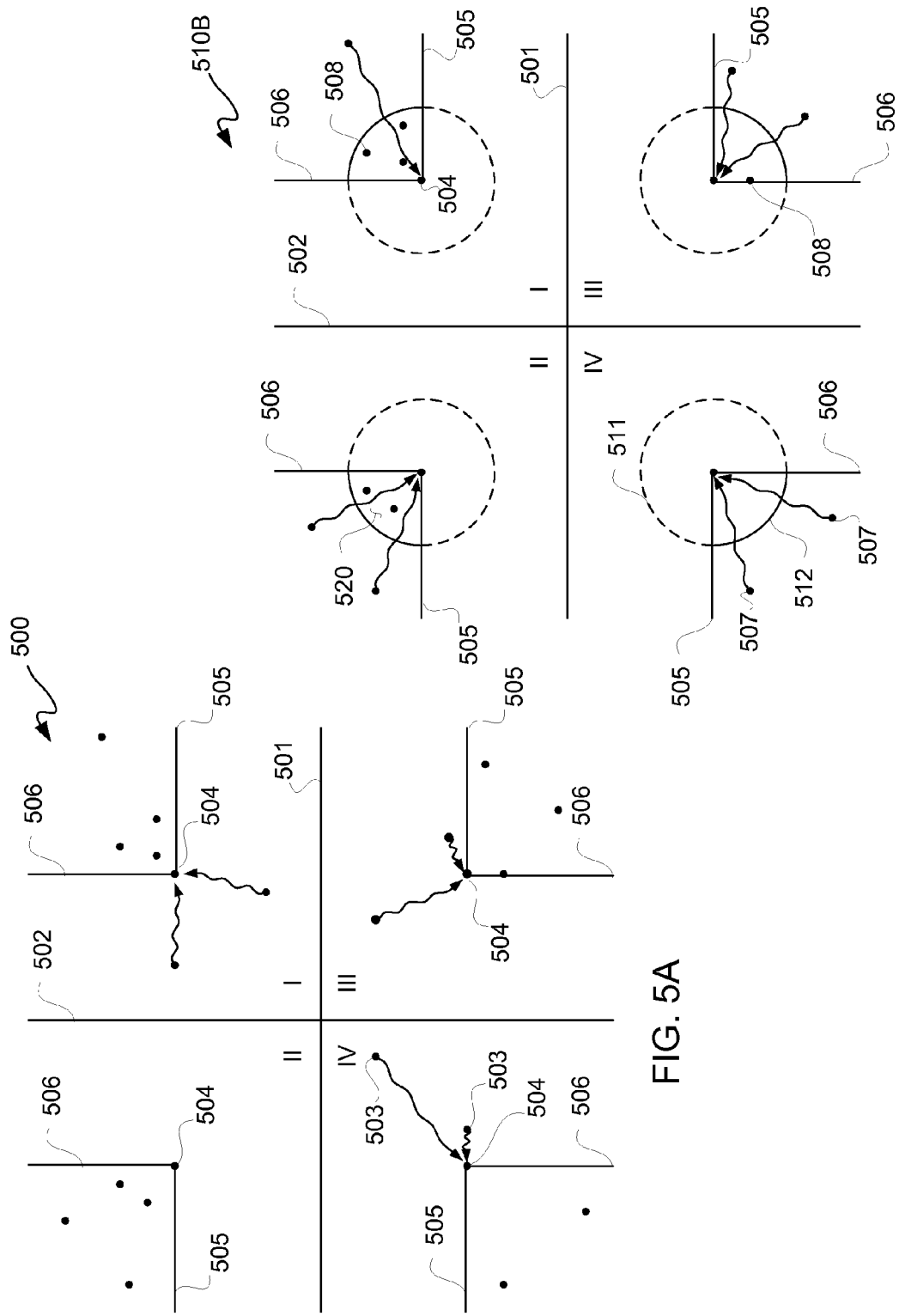

PEAK-TO-AVERAGE POWER RATIO REDUCTION WITH BOUNDED ERROR VECTOR MAGNITUDE

FIELD OF THE INVENTION

The invention relates to integrated circuit devices ("ICs"). More particularly, the invention relates to signal processing for reducing, including without limitation minimizing, a peak to average power ratio of an OFDM and/or OFDMA system with bounded error vector magnitude for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Orthogonal Frequency Division Multiplexing ("OFDM") and Orthogonal Frequency Division Multiple Access ("OFDMA") are popular modulation techniques for broad-band communications. While OFDM and OFDMA have spectral efficiency and involve demodulators of lower complexity for frequency selective channels, they tend to have high peak-to-average power ratios ("PAPR") values which reduce power amplifier efficiency. Others have proposed Active Constellation Extension ("ACE") for PAPR reduction.

An ACE procedure changes symbol locations. However, ACE introduces constellation errors in the transmitter, which may violate error vector magnitude ("EVM") limits, such as for example imposed by some standards. These standards include Third Generation Partnership Project—Long Term Evolution ("3GPP-LTE") and Institute of Electrical and Electronics Engineers ("IEEE") 802.16e ("Mobile WiMax").

SUMMARY OF THE INVENTION

One or more aspects generally relate to integrated circuit devices ("ICs") and, more particularly, to reducing a peak to average power ratio of an OFDM and/or OFDMA system with bounded error vector magnitude for an IC.

An aspect relates generally to a method for signal processing. The method includes performing, using a constellation points adjustment module, an ACE procedure. Symbols outside of a bounded region after the ACE iteration are identified. The bounded region is determined in response to an error vector magnitude target. The symbols identified are translated to the bounded region.

In this method, the symbols can be moved to a location of origin of the bounded region. The constellation can be at least a four quadrature amplitude modulation ("4-QAM") array. The bounded region can be for an edge symbol region of the constellation. The edge symbol region can be a corner symbol region of the constellation. The symbols can be moved to a border of the bounded region. The symbols can be moved into an interior of or onto a border of the bounded region.

Another aspect relates generally to a method for peak-to-average power ratio reduction with bounding of error vector magnitude. First clipped symbols of a constellation are obtained. A first set of the first clipped symbol is first translated using an Active Constellation Extension procedure. A bounded region is set responsive to a threshold for the error vector magnitude. A second set of the first clipped symbols remaining outside of the bounded region is second translated to the bounded region. The first clipped symbols, including the first translated first set of the first clipped symbols and the second translated second set of the first clipped symbols are output for Inverse Fast Fourier Transform processing.

The method can further include obtaining second clipped symbols of the constellation; and repeating the first translating for a first set of the second clipped symbols, the second translating for a second set of the second clipped symbols, and the outputting of the second clipped symbols, including the first translated first set of the second clipped symbols and the second translated second set of the second clipped symbols. The first clipped symbols of the second set can be moved to a location of origin of the bounded region. The constellation can be at least a four quadrature amplitude modulation ("4-QAM") array. The bounded region can be for an edge symbol of the constellation. The edge symbol can be a corner symbol of the constellation. The first clipped symbols of the second set can be moved to a border of the bounded region. The first clipped symbols of the second set can be moved into an interior of or to a border of the bounded region.

Yet another aspect relates generally to a transmitter that includes a constellation points adjustment module. The constellation points adjustment module is configured to perform an ACE translation of a first set of the constellation points and to translate a second set of the constellation points remaining outside of a bounded region to the bounded region.

The constellation points adjustment module can be configured to adjust only those of the constellation points at a periphery of the constellation. The bounded region can be defined for limiting error vector magnitude to a threshold level. The transmitter can be configured for a modulation selected from a group consisting of Orthogonal Frequency Division Multiplexing and Orthogonal Frequency Division Multiple Access. The threshold level can be for a standard selected from a group consisting of 3GPP-LTE and IEEE 802.16e.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIGS. 5A through 5F are graphic diagrams depicting respective exemplary embodiments of constellations for a four Quadrature Amplitude Modulation ("4-QAM") embodiment.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
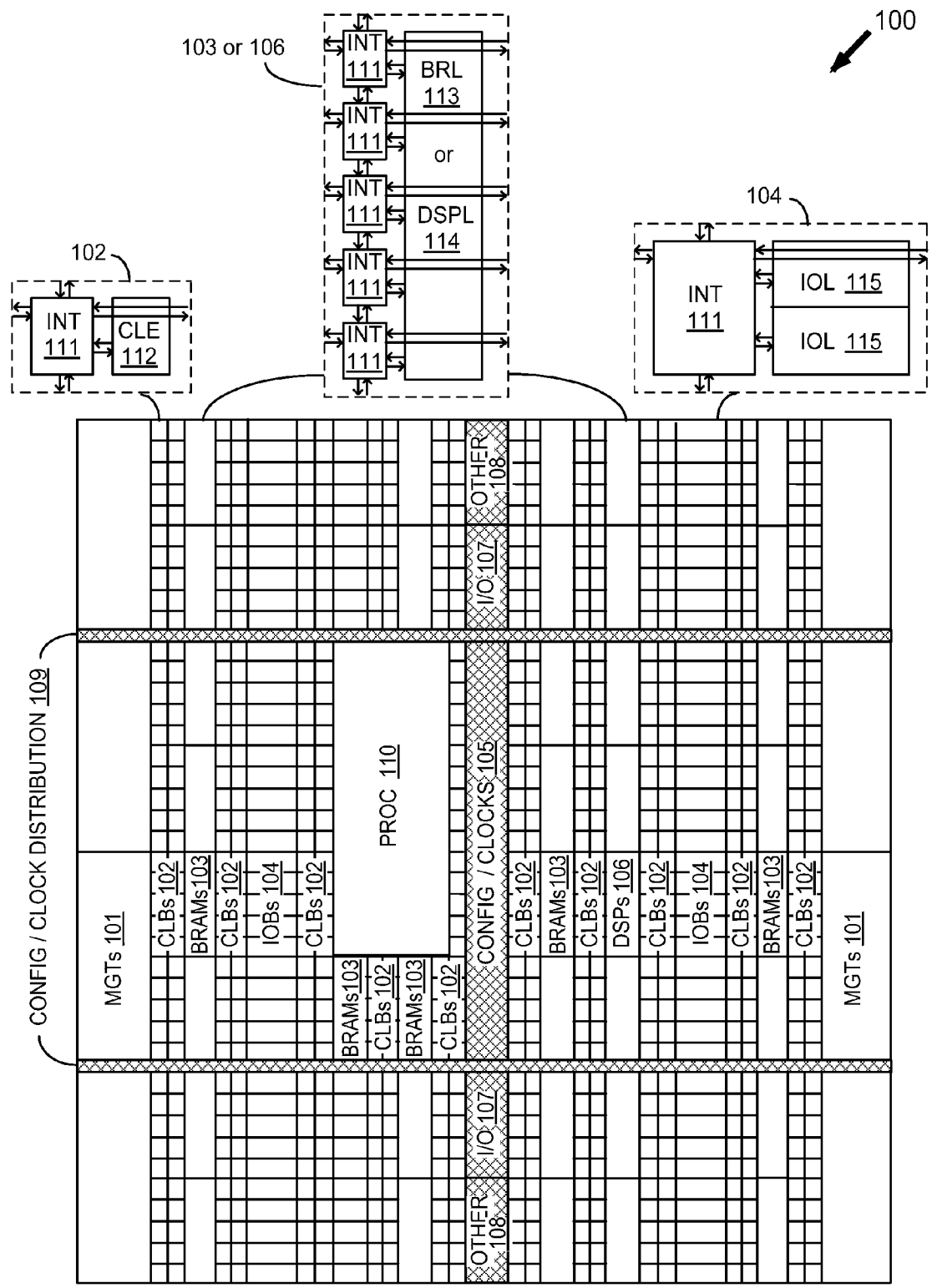
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
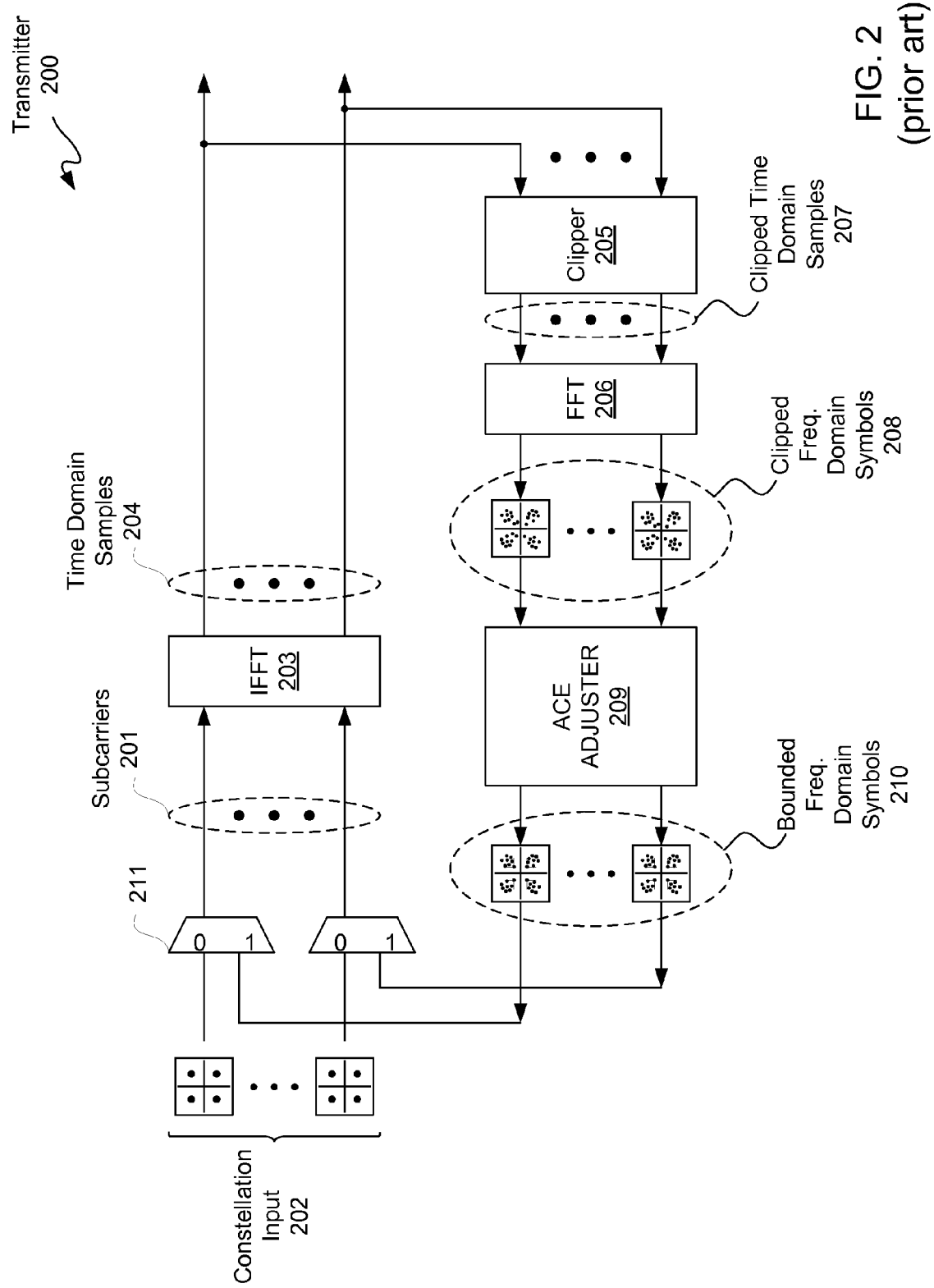
FIG. 2 is a block diagram depicting an exemplary embodiment of a transmitter of the prior art having an Active Constellation Extension ("ACE") adjuster.

FIG. 2 is a block diagram depicting an exemplary embodiment of a transmitter 200 of the prior art. As transmitter 200 is known, an overly detailed description of transmitter 200 is not provided for purposes of clarity. Transmitter 200 may be for OFDM/OFDMA signals, hereinafter collectively and singly referred to as OFDM signals.

Figure 3A:
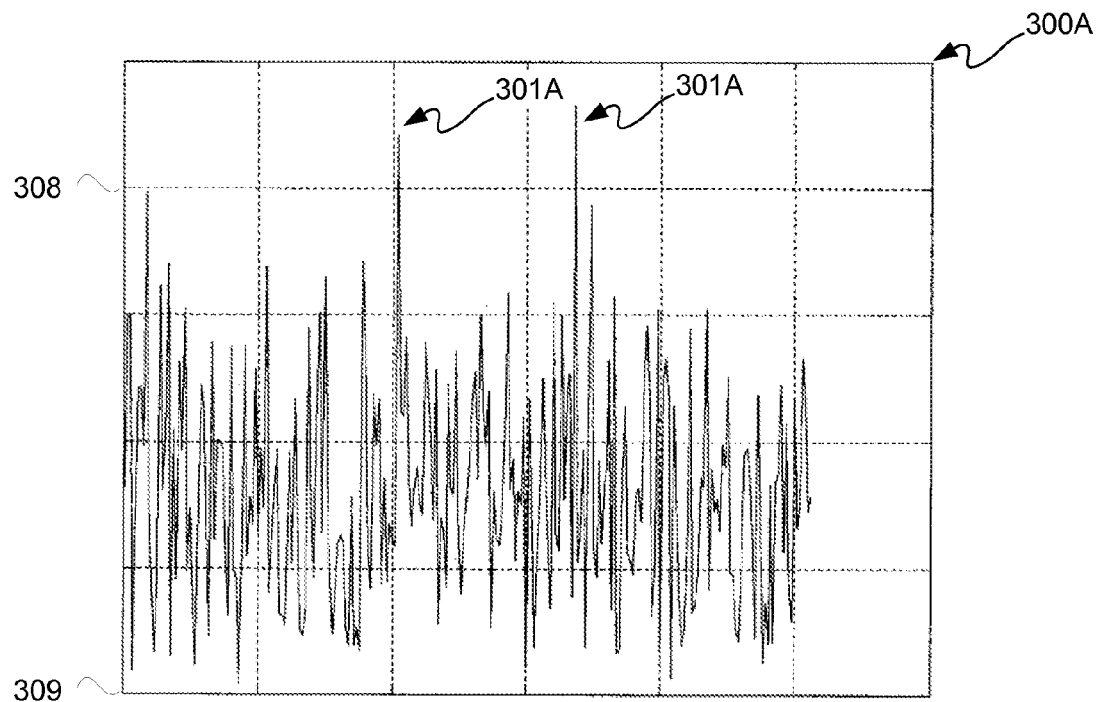
FIGS. 3A and 3B are signal diagrams depicting exemplary embodiments of waveforms of OFDM signals having peaks and clipped peaks, respectively.
Figure 3B:
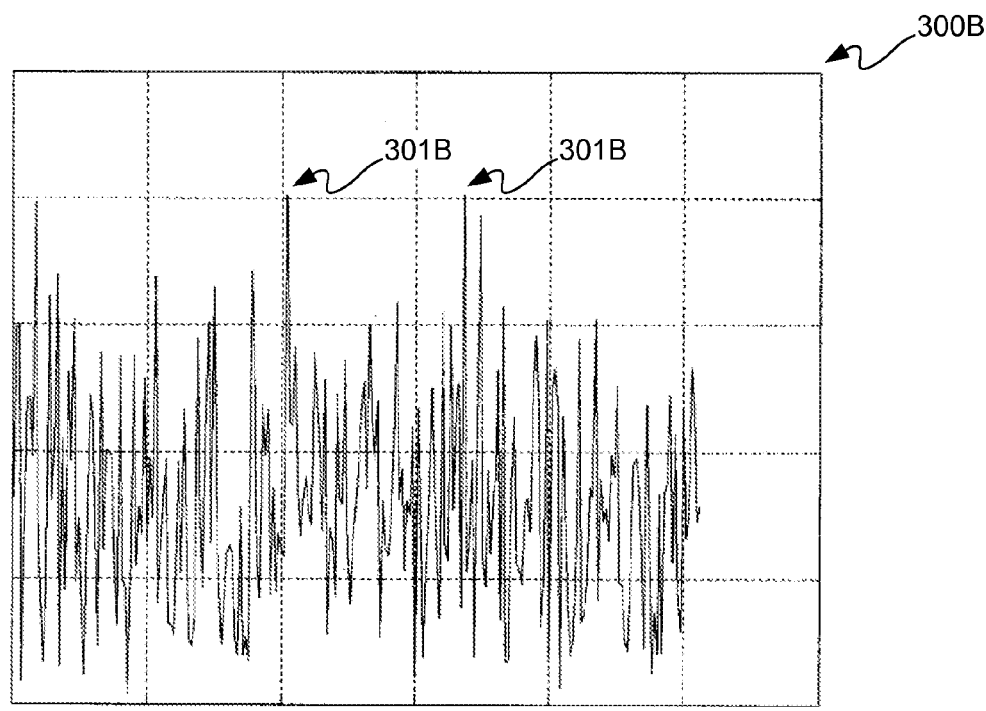

OFDM signals have peaks in their waveform, as illustratively shown in waveform 300A of FIG. 3A. FIG. 3A is a signal diagram depicting an exemplary embodiment of a waveform 300A having peaks 301A. FIG. 3B is a signal diagram depicting an exemplary embodiment of waveform 300A after having peaks 301A clipped, namely waveform 300B having peaks 301B.

With simultaneous reference to FIGS. 2, 3A, and 3B, transmitter 200 is further described. While reducing peaks may take on other known forms other than clipping, it shall be assumed that clipping is used for peak reduction for purposes of clarity by way of example and not limitation. Other examples of peak reduction that may be used include "Tone Reservation."

Rather than just clipping peaks and letting other blocks of transmitter 200 and receiver (not shown or described here for purposes of clarity) deal with errors, an ACE procedure may be used. It should be appreciated that clipping of waveforms may introduce distortions in a spectral domain that violate a spectral mask and introduce adjacent channel interference. While some subcarriers may be dedicated for PAPR reduction by introducing extra symbols, namely reserve tones, to reduce PAPR, tone reservation uses up signal bandwidth and may not be compliant with some standards. An ACE procedure does not use any additional transmission bandwidth and may be implemented without having to change known standards, some of which are previously referenced herein.

Constellation input 202, which in this example is a four Quadrature Amplitude Modulation ("4-QAM") constellation, is respectively provided via subcarriers 201 to an Inverse Fast Fourier Transform block ("IFFT") 203 for producing time domain samples 204. Time domain samples 204 may be provided to a clipper 205. Time domain waveforms, such as the one illustratively shown in FIG. 3A, are clipped at a user specified threshold(s), such as an upper threshold 308 and a lower threshold 309, by clipper 205 to produce clipped waveforms, such as the one illustratively shown in FIG. 3B.

However, as previously described, clipping may introduce distortions. In the frequency domain, such distortions may be observable as symbols or points of a constellation moving away from their respective location of origin. Thus, clipped time domain samples 207 output from clipper 205 may be provided to Fast Fourier Transform block ("FFT") 206 for providing clipped frequency domain symbols 208. It should be appreciated that clipped frequency domain symbols 208 have moved away from their locations of origin, which is generally indicated as more spreading of points or symbols in clipped frequency domain signals 208 as compared with constellation input 202.

Clipped frequency domain symbols 208 may be provided to an ACE adjuster 209 to reduce constellation errors which may be relatively high and which may increase EVM. ACE adjuster 209 is configured to perform an ACE iteration. An ACE iteration moves symbols back to their original locations on a selective basis to produce bounded domain symbols 210. Those symbols that minimize symbol distance are moved back to their original locations, and those symbols that increase symbol distance are retained or otherwise not selected for relocation. Multiplexers 211 may be used for selecting between inputs 202 and 210 to IFFT 203.

An ACE iteration by ACE adjuster 209 may cause different peaks in time domain samples with respect to those peaks input to ACE adjuster 209 represented in the frequency domain for such iteration. Accordingly, the same ACE procedure may be iterated multiple times. From the following description, it should be appreciated that EVM bounding as described herein may be applied to any of the ACE iteration techniques to limit EVM.

Figure 4:
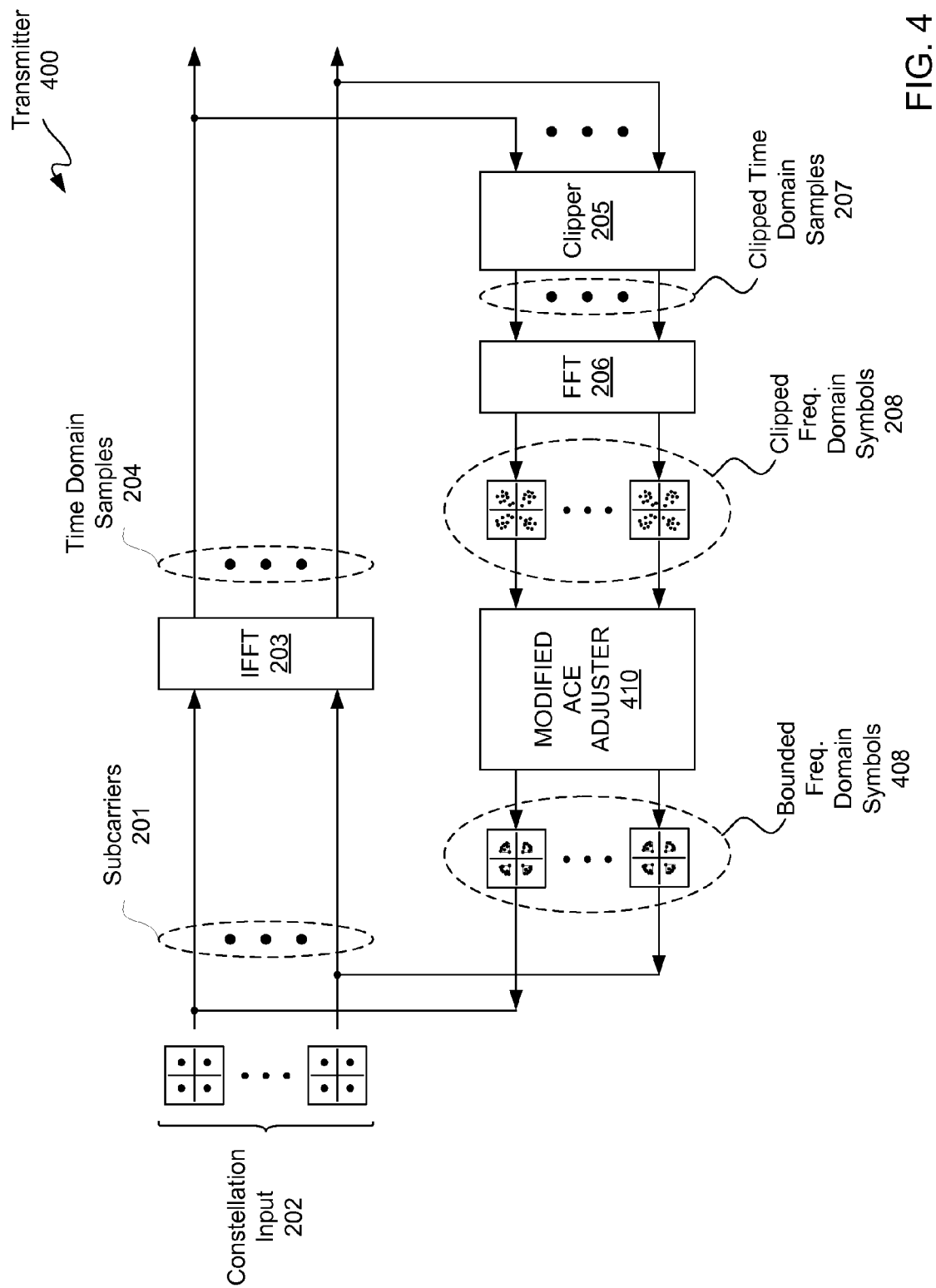
FIG. 4 is a block diagram depicting an exemplary embodiment of a transmitter with a Modified ACE adjuster for producing bounded domain symbols.

FIG. 4 is a block diagram depicting an exemplary embodiment of a transmitter 400. Transmitter 400 of FIG. 4 is similar to transmitter 200 of FIG. 2, except that ACE adjuster 209 is replaced with a "Modified ACE" adjuster (i.e., a constellation points adjustment module) 410 for producing bounded domain symbols 408. Operation of "Modified ACE" adjuster 410 is described with simultaneous reference to FIG. 4 and the respective exemplary embodiments depicted by the graphic diagrams of FIGS. 5A through 5E.

Referring to FIG. 5A, a constellation 500, such as a constellation of clipped frequency domain symbols 208, is input to Modified ACE adjuster 410. In this example, a 4-QAM constellation is illustratively shown, however it should be appreciated that QAM sizes larger than four may be used. As is known, QAM symbols are located in one of four quadrants I through IV in a constellation map defined by real and imaginary axes 501 and 502, respectively, for complex numbers.

For an ACE portion of a Modified ACE algorithm, points or symbols 503 closer to at least one of axis 501 and axis 502 than a point of origin 504 for a quadrant are moved or translated to the point of origin 504. Reference lines 505 and 506, which emanate from points of origin 504 and respectively parallel axis 501 and axis 502, are illustratively shown to more clearly identify those points 503 to be translated by an ACE iteration.

Referring to FIG. 5B, there is shown a graphic diagram depicting an exemplary embodiment of a constellation 510B, which is constellation 500 of FIG. 5A after an ACE portion or iteration of a Modified ACE algorithm. Points 507 and 508, as well as any symbols or points lying on points of origin 504, are unaffected by an ACE portion of a Modified ACE algorithm. Points 507 are in a region bounded by axes 505 and 506 for each quadrant I through IV, and thus do not lie between axes, for example between axis 506 and 502 or between axis 505 and 501. Points 507 and 508 may lay on axis 505 or 506. For constellation 510B, a bounding perimeter 511 may be defined from a radius of point of origin 504 in each of quadrants I through IV. Bounding perimeters 511 may be determined responsive to an EVM threshold level. However, after completion of an ACE portion of a Modified ACE algorithm, points or symbols between axis 501 and reference lines 505 or between axis 502 and reference lines 506, or a combination thereof, will have already been translated, and thus a portion, as generally identified by a dashed line, of each bounding perimeter 511 is not of concern. Accordingly, for each quadrant, a region or area defined by reference lines 505 and 506 and such dashed line portion of bounding perimeter 511 is not used.

Rather, an arc 512, which in this example for a corner symbol of a constellation is for π/4 arc length, portion of perimeter 511 going from reference line 505 to reference line 506 and radially extending from point of origin 504 in each quadrant I though IV is used. Thus, for each quadrant I through IV, arc length 512 and references lines 505 and 506 define a bounded region or area 520. Region 520 may be used to delineate which points are to be translated by a Modified ACE iteration performed by Modified ACE adjuster 410 to bound EVM to a threshold value, and which points are not. Thus for example, points 507 outside of regions 520 are to be translated to reduce EVM associated with constellation 510C and 510D and points 508 within regions 520 are not translated. It should be understood that the relative effect of points outside of regions 520 may increase EVM beyond a threshold level.

Figures 5C, 5D:
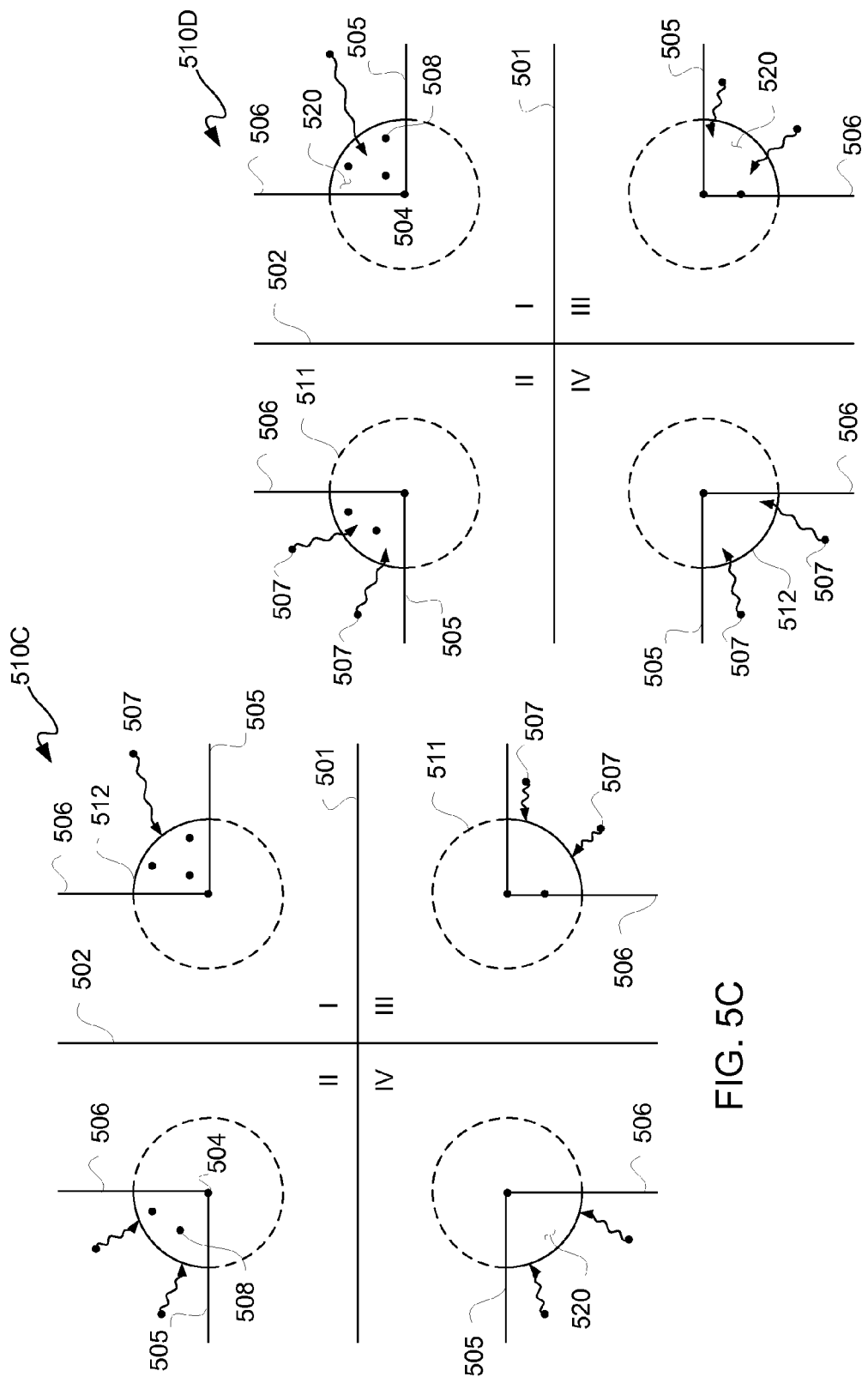

In the exemplary embodiment of FIG. 5B, points 507 are all translated to points of origin 504 respectively associated with a quadrant in which such points 507 are located, as generally indicated by squiggly lines with arrows. Points 507 need not necessarily be translated to respective points of origin 504 to reduce EVM to be within a threshold level. For example, in FIG. 5C, there is illustratively shown a graphic diagram depicting an exemplary embodiment of a constellation 510C. Constellation 510C is constellation 510B of FIG. 5B, except that points 507 are translated onto borders of bounded regions 520, such as onto arc lengths 512, respectively associated with the quadrants in which such points 507 are located, as generally indicated by squiggly lines with arrows.

Furthermore, points 507 may alternatively be translated or moved to locations within the peripheries of bounded regions 520, as generally illustratively shown by a graphic diagram depicting an exemplary embodiment of a constellation 510D in FIG. 5D. In FIG. 5D, constellation 510D, which is constellation 510B of FIG. 5B, expect as depicted with points 507 translated, as generally indicated by squiggly lines with arrows, to the interiors of bounded regions 520 within quadrants I through IV respectively associated with such points 507.

Accordingly, it should be appreciated with reference to FIGS. 5B through 5D, points outside a bounded region 520 after a Modified ACE portion of a Modified ACE algorithm may be moved to a point of origin 504 of a bounded region 520, to a border or a periphery of a bounded region 520, or to the interior of a bounded region 520, or any combination thereof. For purposes of clarity by way of example and not limitation, it shall, however, be assumed that points 507 are moved to points of origin 504 of respective quadrants associated with such points 507, as illustratively shown in the constellation diagram of FIGS. 5B and 5E.

Figure 5E:
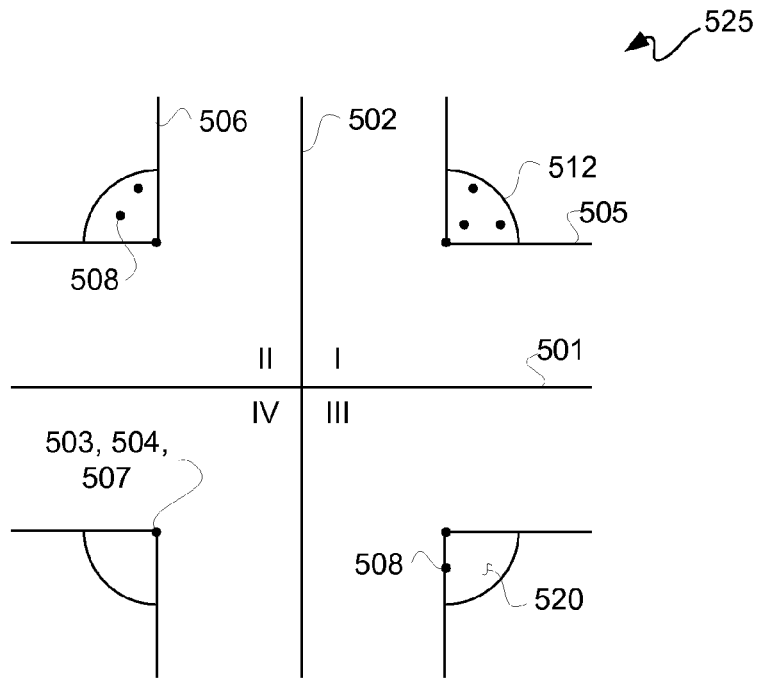

In FIG. 5E, constellation 525 is illustratively shown as having all points or symbols associated with quadrants I through IV being translated to a bounded region, namely bounded region or regions 520. Thus, constellation 525 is constellation 510B of FIG. 5B after translating points 507 to points of origin 504. For this exemplary embodiment, points 503 and 507 are translated to respective points of origin 504 on a quadrant-by-quadrant basis.

Figure 5F:
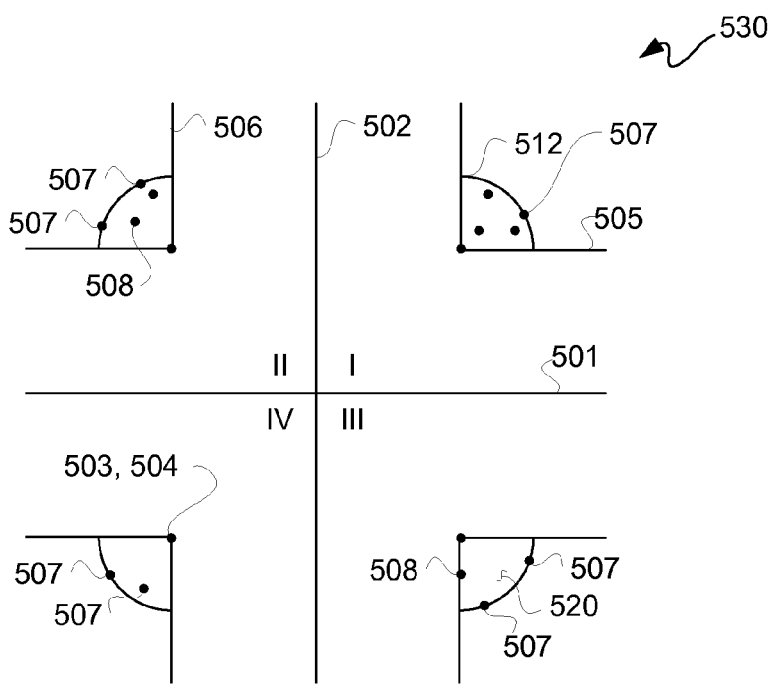

In FIG. 5F, constellation 530 is illustratively shown as having all points or symbols associated with quadrants I through IV being translated to a bounded region or regions 520. Thus, constellation 530 is constellation 510B of FIG. 5B after translating points 507 to points either within bounded regions 520 or on the boundary of bounded regions 520 on a quadrant-by-quadrant basis.

Figure 6:
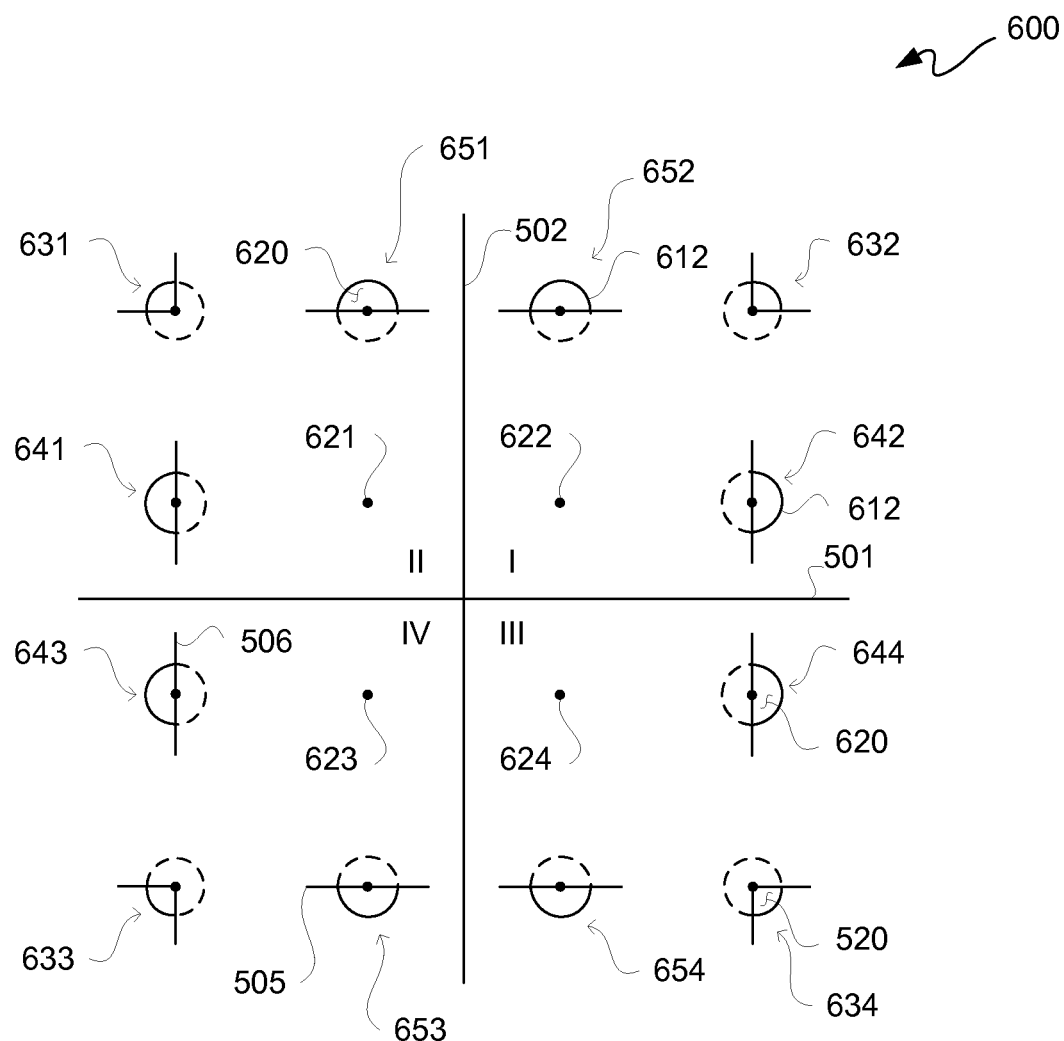
FIG. 6 is a graphic diagram depicting an exemplary embodiment of a constellation for a 16-QAM embodiment.

In FIG. 6, there is illustratively shown a graphic diagram depicting an exemplary embodiment of a constellation 600. For purposes of clarity by way of example and not limitation, a scattering of points or symbols is not illustratively shown in FIG. 6.

FIG. 6 illustratively shows bounded regions 520 and 620 for a 16-QAM embodiment. Bounded regions 520 are associated with corner symbols 631 through 634 at the periphery of constellation 600 are as previously described with reference to the 4-QAM embodiment of FIGS. 5A through 5E. However, bounded regions 620 are associated with other periphery locations of constellation 610, namely edge symbols 641-644 and 651-654.

Interior symbols 621 through 624 are unaltered by Modified ACE adjuster 410 of FIG. 4. Vertical edge symbols 641 through 644 have bounded regions 620 defined by intersections of reference lines 506 (parallel to axis 502) and arc sections or lengths 612. Arcs 612 for vertical bounded regions 620 extend from and to reference lines 506 and radially emanate away from points of origin 504. Vertical edge symbols 641 through 644 thus have semicircular or π/2 arcs. Arcs 612 of vertical bounded regions 620 in quadrants I and III extend from reference line 506 in a positive direction with respect to axis 501. Arcs 612 of vertical bounded regions 620 in quadrants II and IV extend from reference line 506 in a negative direction with respect to axis 501.

Horizontal edge symbols 651 through 654 have bounded regions 620 which are defined by intersections of axis 505 (parallel to axis 501) and arcs 612. Arcs 612 for horizontal bounded regions 620 extend from and to reference lines 505 and radially emanate away from points of origin 504. Horizontal edge symbols 651 through 654 thus have semicircular or π/2 arcs. Arcs 612 of horizontal bounded regions 620 in quadrants I and II extend from reference line 505 in a positive direction with respect to axis 502. Arcs 612 of horizontal bounded regions 620 in quadrants III and IV extend from reference line 505 in a negative direction with respect to axis 502.

With renewed reference to FIG. 4, it should be appreciated that new peaks may be introduced by feeding bounded domain symbols 408 back as subcarriers 201 for input to IFFT 203 for a subsequent iteration. Accordingly, there may be more than one iterative cycle for reducing peaks for having an output which meets a peak threshold for purposes of PAPR and also meets EVM threshold. Even though peaks were shown clipped only on a positive side on waveform 300A of FIG. 3B, namely clipped waveform 300B of FIG. 3B, it should be appreciated that clipping may occur for either or both positive and negative amplitudes. Thus, both positive and negative thresholds may be used for clipping.

Figure 7:
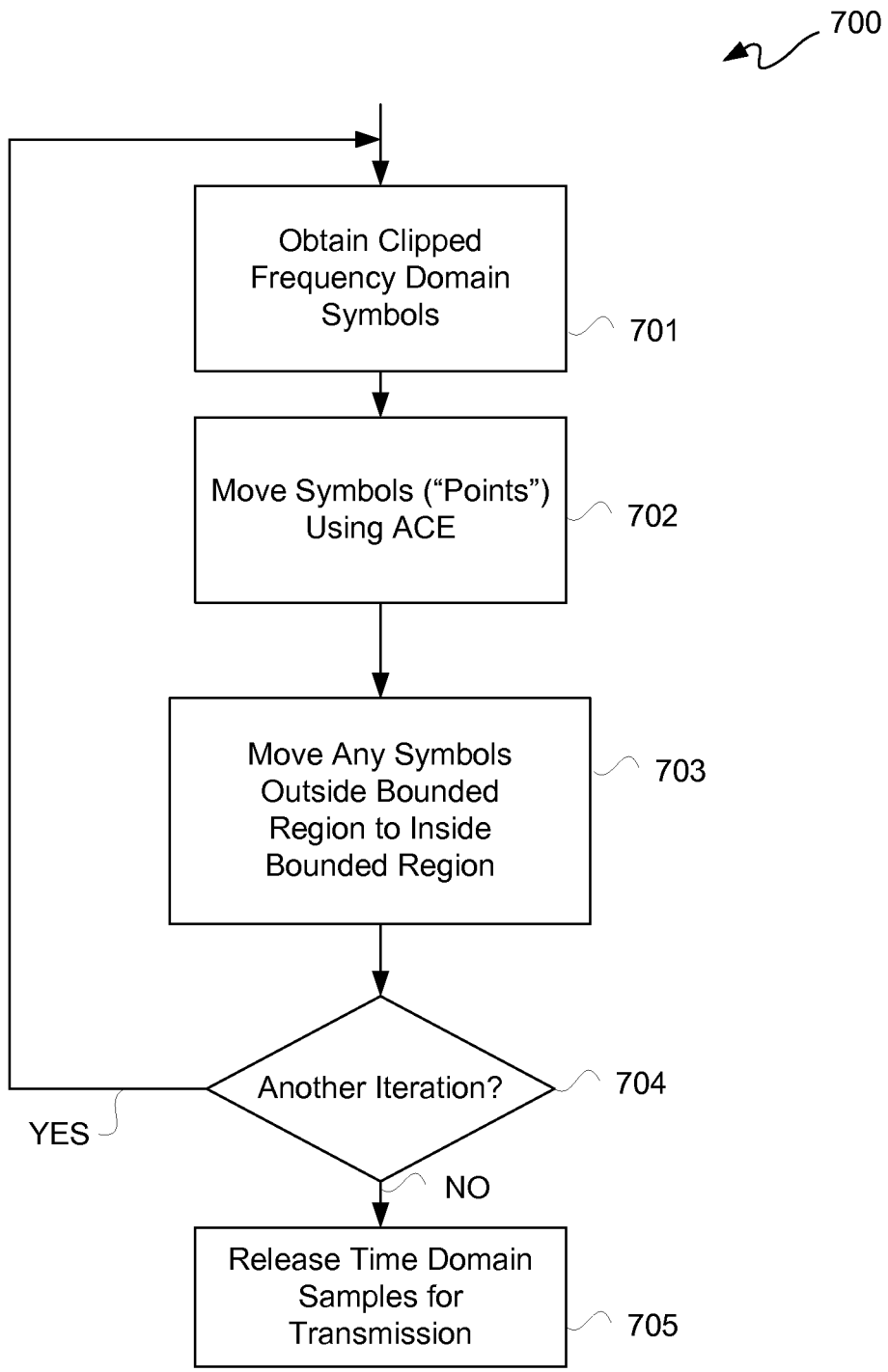
FIG. 7 is a flow diagram depicting an exemplary embodiment of a signal processing flow.

FIG. 7 is a flow diagram depicting an exemplary embodiment of a signal processing flow 700. At 701, clipped frequency domain symbols are obtained. At 702, any symbols that may be moved of the symbols obtained at 701 using an ACE iteration are moved or translated at 702.

At 703, a bounded region for an EVM target or responsive to an EVM target may be applied for determining which if any symbols after an ACE iteration performed at 702 remain outside of such bounded region as determined at 703. If any of such symbols are outside such bounded region as determined at 703, such symbols may be moved, as previously described herein, to such bounded region.

At 704, it may be determined whether another iteration is to be performed. This determination may be based on whether other peaks have been created that need to be clipped for purposes of PAPR, and hence there may be other symbols outside of a bounded region which would not be addressed by an ACE iteration. However, with respect to determining whether another iteration is performed at 704, it should be understood that a set number of iterations may be implemented, where such number is known to address PAPR and EVM issues within such set number of iterations. For example, one, two, or three iterations may be sufficient for some applications.

After all iterations have been completed, Modified ACE adjusted frequency domain symbols of a final iteration that are IFFT converted to time domain samples may be released for transmission at 705. Even though a storage array for storing time domain samples for output is not illustratively shown in FIG. 4, it should be understood that control circuitry and arrays for storing time domain samples for transmission are known, and thus are not described herein in any unnecessary detail for purposes of clarity.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for signal processing, comprising:
reducing peaks of time domain waveforms;
converting the time domain waveforms having reduced peaks to clipped frequency domain symbols;
performing, using a constellation points adjustment module, an Active Constellation Extension ("ACE") procedure, wherein for each of four quadrants, each symbol of the clipped frequency domain symbols in a quadrant thereof moved during the ACE procedure is moved to an extension region from the ACE procedure defined by intersecting axes within the quadrant thereof;
defining, for each of the four quadrants, a respective bounding perimeter comprising an arc at a distance of an error vector magnitude target from a radius of a point of origin in the quadrant thereof;
bounding, for each of the four quadrants, a bounded region established by intersection of the arc with the intersecting axes of the extension region associated therewith;
wherein the bounded region is not all but a portion of the extension region;
identifying, for each of the four quadrants, symbols outside of the arc of the bounded region but within the extension region after the ACE procedure;
translating, for each of the four quadrants, the identified symbols thereof in the extension region thereof but outside of the bounded region associated therewith to the bounded region associated therewith;
determining a peak-to-average power ratio after the translating of the identified symbols to the bounded region; and
determining whether to perform another ACE procedure based upon the peak-to-average power ratio determined.

2. The method according to claim 1, wherein the identified symbols are moved in each of the four quadrants to the point of origin of the bounded region respectively thereof.

3. The method according to claim 2, wherein the ACE procedure is performed on a constellation which is at least a four quadrature amplitude modulation ("4-QAM") array.

4. The method according to claim 3, wherein, for each of the four quadrants, the bounded region is for an edge symbol region of the constellation.

5. The method according to claim 4, wherein, for each of the four quadrants, the edge symbol region is a corner symbol region of the constellation.

6. The method according to claim 1, wherein the identified symbols in each of the four quadrants are moved to a border of the bounded region respectively thereof.

7. The method according to claim 1, wherein the identified symbols, for in each of the four quadrants are moved into an interior of or onto a border of the bounded region respectively thereof.

8. A method for reduction of a peak-to-average power ratio, comprising:
reducing peaks of time domain waveforms;
converting the time domain waveforms having reduced peaks to clipped frequency domain symbols;
obtaining first clipped symbols of the clipped frequency domain symbols of a constellation;
first translating a first set of the first clipped symbols, using a constellation points adjustment module, to perform an Active Constellation Extension ("ACE") procedure, wherein for each of four quadrants, each symbol moved during the ACE procedure is moved to an extension region of the ACE procedure defined by intersecting axes within each quadrant of the four quadrants for extension regions of the ACE procedure;
bounding, for each quadrant, a bounded region established in part by the intersecting axes of the extension region;
setting, for each quadrant, a bounding perimeter comprising an arc of the bounded region at a radius of a point of origin responsive to a threshold for an error vector magnitude;
second translating, for each quadrant, a second set of the first clipped symbols in the extension region but remaining outside of the arc of the bounded region associated therewith to the bounded region associated therewith;
outputting, for each of the four quadrants, the first clipped symbols, including the first translated first set of the first clipped symbols and the second translated second set of the first clipped symbols, for Inverse Fast Fourier Transform processing;
determining the peak-to-average power ratio after the Inverse Fast Fourier Transform processing; and
determining whether to perform another ACE procedure based upon the peak-to-average power ratio determined.

9. The method according to claim 8, further comprising:
obtaining second clipped symbols of the constellation; and
repeating, for each of the four quadrants, the first translating for a first set of the second clipped symbols, the second translating for a second set of the second clipped symbols, and the outputting of the second clipped symbols, including the first translated first set of the second clipped symbols and the second translated second set of the second clipped symbols.

10. The method according to claim 8, wherein the first clipped symbols of the second set are moved, for each of the four quadrants, to the point of origin of the bounded region respectively thereof.

11. The method according to claim 10, wherein the ACE procedure is performed on a constellation which is at least a four quadrature amplitude modulation ("4-QAM") array.

12. The method according to claim 11, wherein, for each of the four quadrants, the bounded region is for an edge symbol region of the constellation.

13. The method according to claim 12, wherein, for each of the four quadrants, the edge symbol is a corner symbol of the constellation.

14. The method according to claim 8, wherein, for each of the four quadrants, the first clipped symbols of the second set are moved to a border of the bounded region respectively thereof.

15. The method according to claim 8, wherein, for each of the four quadrants, the first clipped symbols of the second set are moved into an interior of or to a border of the bounded region respectively thereof.

16. A transmitter, comprising:
a constellation points adjustment module, wherein the constellation points adjustment module is configured to:
reduce peaks of time domain waveforms;
convert the time domain waveforms having reduced peaks to clipped frequency domain symbols;
perform an Active Constellation Extension ("ACE") translation of the clipped frequency domain symbols of a first set of constellation points of a constellation, wherein for each of four quadrants, each constellation point moved during the ACE translation is moved to an extension region of the ACE procedure defined by intersecting axes within the quadrant thereof;
define, for each of the four quadrants, a respective bounding perimeter comprising an arc at a distance of an error vector magnitude target from a radius of a point of origin in the quadrant thereof;

bound, for each of the four quadrants, a bounded region established by intersection of the arc with the intersecting axes;

wherein the bounded region is defined, for each of the four quadrants, for limiting error vector magnitude to a threshold level;

translate, for each of the four quadrants, a second set of the constellation points of the constellation remaining in the extension region defined by the intersecting axes but outside of the arc of the bounded region associated therewith to the bounded region associated therewith;

determine a peak-to-average power ratio after translation of the second set of constellation points to the bounded region; and determine whether to perform another ACE translation based upon the peak-to-average power ratio determined.

17. The transmitter according to claim 16, wherein the constellation points adjustment module is configured to adjust only those of the constellation points at a periphery of the constellation.

18. The transmitter according to claim 17, wherein the transmitter is configured for a modulation selected from a group consisting of Orthogonal Frequency Division Multiplexing and Orthogonal Frequency Division Multiple Access.

* * * * *